United States Patent [19]

Vandergriff

[11] 3,911,832

[45] Oct. 14, 1975

[54] DECK STRUCTURE FOR VEHICLES

[75] Inventor: Buford E. Vandergriff, Naperville, Ill.

[73] Assignee: Van Craft Industries, Inc., Naperville, Ill.

[22] Filed: May 10, 1974

[21] Appl. No.: 468,662

Related U.S. Application Data

[63] Continuation-in-part of Ser. No. 395,774, Oct. 12, 1973, abandoned.

[52] U.S. Cl. ............ 105/372; 296/24 R; 248/119 R
[51] Int. Cl.² .......................................... B61D 3/06
[58] Field of Search .......... 105/328, 370, 372, 373; 296/24 R; 52/36, 69; 248/119 R; 108/42, 44; 211/149, 178

[56] References Cited
UNITED STATES PATENTS

| | | | |
|---|---|---|---|
| 901,105 | 10/1908 | Johnston | 105/373 |
| 2,149,015 | 2/1939 | Giddings | 105/372 |

*Primary Examiner*—M. Henson Wood, Jr.
*Assistant Examiner*—Gene A. Church
*Attorney, Agent, or Firm*—McDougall, Hersh & Scott

[57] ABSTRACT

A deck structure for use in supporting articles at an intermediate level spaced upwardly from the bed of a vehicle. In a first embodiment the deck structure comprises a first section pivotally connected at the intermediate level and adapted to be moved between a vertical position adjacent a side wall of the vehicle and a horizontal position extending outwardly from the side wall. A second section of the deck is pivotally connected to the first section, and this second section is adapted to be vertically positioned adjacent the side wall in a position extending opposite the position of the first section. The second section is adapted to be pivoted relative to the first section during pivoting of the first section to the horizontal position whereby the second section can also be moved to a horizontal position to complete the span between the side walls of the vehicle thereby providing a deck at an intermediate level. A second embodiment utilizes a unitary deck structure adapted to move between the vertical and horizontal positions. A third embodiment employs a telescoping deck structure.

32 Claims, 52 Drawing Figures

DECK STRUCTURE FOR VEHICLES

CROSS REFERENCE TO RELATED APPLICATION

This application is a continuation-in-part of my application Ser. No. 395,774 filed Oct. 12, 1973, now abandoned.

This invention generally relates to vehicle constructions, for example railway cars, truck vans and the like. The invention is particularly concerned with means for efficiently supporting articles in the vehicles during transportation of the articles from one location to another.

In a typical railway car or truck van, a horizontal bed or floor is provided for supporting articles being transported. Articles are placed on this bed, and depending upon the size of the articles, they may be stacked upon each other at two or more levels. In some instances, however, stacking of the articles may be impractical due to the weight or configuration thereof in which case substantial amounts of the vehicle interior may be unusable. As an example, where the articles or containers therefor are of a somewhat fragile character, damage to the articles would occur if stacked to the extent that the weight of the upper articles would damage lower articles. In those instances, it is often necessary to avoid stacking or to minimize the amount of stacking.

Some articles are also somewhat difficult to handle due to the weight and configuration thereof, and this also creates problems for individuals loading the articles on a bed. For example, even if articles at a lower level will not be damaged when other articles are stacked thereon, the stacking operation itself may be quite cumbersome and inefficient due to the size and weight of the articles.

Attempts have been made to alleviate some of these problems by incorporating intermediate decks in vehicles. In such vehicles, stacking problems can be avoided since the deck will support the weight of the upper articles, and the amount of manual lifting of articles can be minimized if workmen can move around on a deck level. Vehicles with permanent decks are, however, of limited versatility. Furthermore, the use of collapsible of removable intermediate decks has not met with any success due to inefficiencies in the design of the decks which make the decks either too expensive for practical purposes or too inconvenient to use.

It is a general object of this invention to provide an improved vehicle construction whereby articles can be more efficiently supported for transportation purposes.

It is a further object of this invention to provide a vehicle construction of the type described which includes an intermediate deck arrangement adapted to provide maximum efficiency in the use of the construction.

It is a more particular object of this invention to provide an intermediate deck construction which is capable of providing the necessary support for articles loaded in a vehicle and which is at the same time of a highly efficient design whereby the deck can be economically installed in a vehicle and operated in a convenient fashion.

These and other objects of this invention will appear hereinafter and for purposes of illustration, but not of limitation, specific embodiments of the invention are shown in the accompanying drawings in which.

This invention generally relates to vehicles for transporting articles and is particularly suited for use in connection with railway cars, truck vans and the like. In such vehicles, a bed is provided for supporting articles and side walls extend upwardly on opposite sides of the bed to provide at least a partial enclosure. The particular improvement of the invention is directed to a collapsible deck which will serve to support articles at an intermediate level spaced upwardly from the bed of the vehicle.

According to a first embodiment, the collapsible deck construction particularly includes a first section which is pivotally connected to one side wall of the vehicle at the intermediate level. This section is adapted to be pivoted between vertical and horizontal positions with the former position being assumed when the deck is not being used and with the latter position comprising the position of use. A second deck section is provided, and this deck section is pivotally connected to the first section. In a position of use, the second section extends outwardly beyond the first section to complete the span between the side walls of the vehicle, and means are provided for supporting the end of the second section. When not in use, the second section pivots away from the first section into a vertical position along a side wall of the vehicle with the two sections extending on opposite sides of the intermediate level whereby a minimum amount of space is occupied by the sections to permit substantially full utilization of the space provided for supporting articles in the vehicle.

Figures 1, 2, 3, 4, 5, 6:
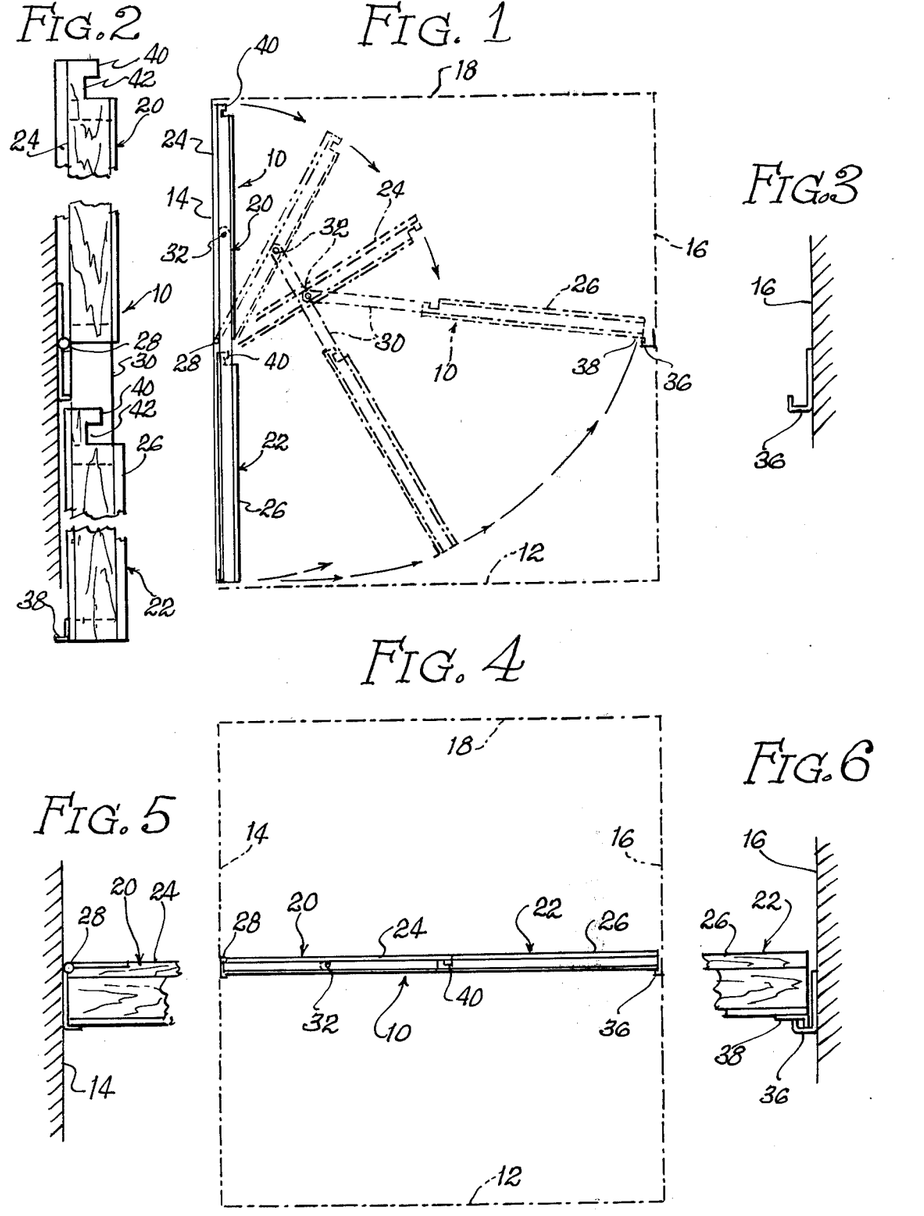
FIG. 1 is an elevational view of a deck construction of the type contemplated by the invention.
FIG. 2 is an enlarged fragmentary view of the deck construction illustrated in the vertical position which is assumed when the deck is not in use.
FIG. 3 is an enlarged fragmentary view illustrating a support member of the type adapted to be associated with a vertical side wall for use in conjunction with the deck.
FIG. 4 is an elevational view of the deck construction shown in the horizontal position of use.
FIG. 5 is a fragmentary end view of the deck construction in the horizontal position.
FIG. 6 is a fragmentary view of the opposite end of the deck construction.
Figure 7:
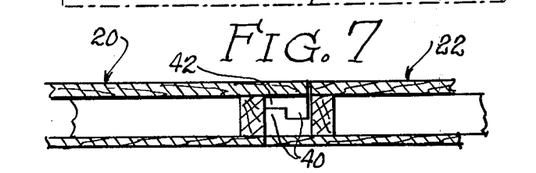
FIG. 7 is a fragmentary cross-sectional view illustrating one form of a deck interlocking means.

FIGS. 1 through 14 illustrate the first embodiment of the invention comprising a deck structure 10. As best shown in FIG. 1, this deck structure is adapted to be associated with a vehicle body or the like with the position of the bed or floor of the body being designated by the line 12, and the vertically extending side walls being indicated at 14 and 16. A top wall 18 may be provided although this is not required for purposes of achieving the results of the invention.

The deck structure comprises a first section 20 and a second section 22. The section 20 comprises a flat bed portion 24 with a corresponding flat bed portion 26 being associated with the section 22. The section 20 is pivotally connected to the side wall 14 by means of hinge 28, this hinge being located at approximately the mid-point of the side wall. In this connection, the location of the deck may be varied, depending upon the desired position of the deck and the dimensions of the vehicle. One feature of the deck structure involves covering the span between the side walls 14 and 16, and this dimension, therefore, controls to some extent the height at which the hinge 28 can be positioned.

The deck section 22 carries a pair of arms 30, and these arms define openings which receive pivot pins 32 carried by the deck section 20. Channels 34 are defined in the underside of the deck section 20 whereby the arms 30 are received within the channels when the section 22 is folded into position relative to the section 20.

One position occupied by the sections 20 and 22 is a vertical position illustrated in FIG. 1. In this instance, the section 20 extends upwardly above the level of the hinge 28, and this section lies flat against the side wall 14. Similarly, the deck section 22 is positioned immediately adjacent this side wall with the arms 30 being received within one portion of the channels 34. With this arrangement, the deck section 22 also occupies a minimum amount of the space defined by the interior of the vehicle.

As shown in FIG. 4, the deck sections are adapted to occupy a horizontal position. In this position, the section 20 is pivoted downwardly while at the same time, the section 22 is pivoted upwardly relative to the section 20. This arrangement results in the eventual formation of a deck which extends completely across the span defined between the vehicle walls. The wall 16 carries an angle support 36, and the outer end of the deck section 22 carries an angle member 38 adapted to be received by the member 36 as best shown in FIG. 6. Accordingly, the outer end of the deck is held firmly in position for purposes of supporting articles which are loaded onto the deck.

The respective deck sections each define tongues 40 and adjacent grooves 42. These tongues and grooves serve to interlock the adjacent ends of the deck sections when the decks are moved to the horizontal position. This interlocking is of primary importance from the standpoint of providing lateral stability for the deck structure. Thus, the tongue and groove type arrangement prevents any significant movement of one deck section relative to the other when the deck is brought into the horizontal position shown in FIG. 4.

Figure 8:
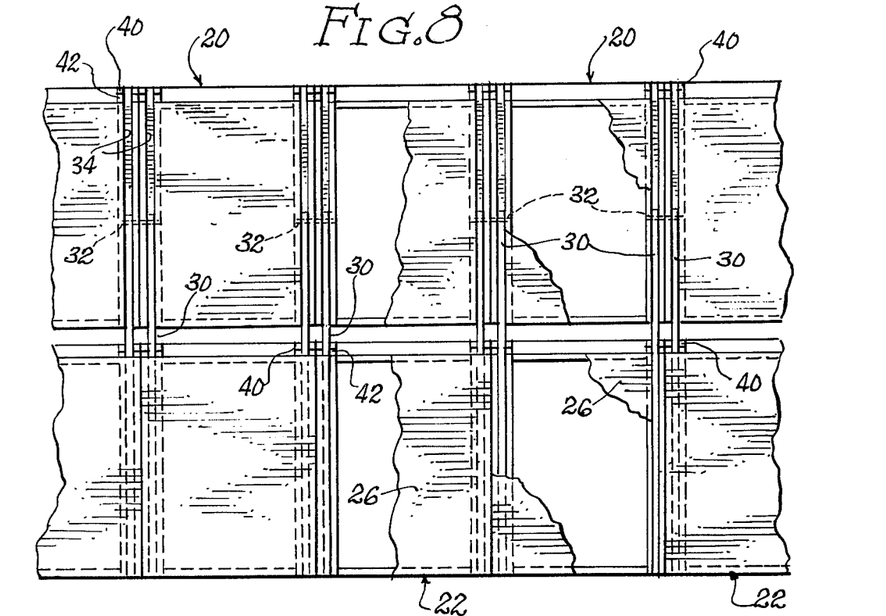
FIG. 8 is a fragmentary elevational view of a vehicle side wall illustrating a plurality of deck constructions associated with the side wall.
Figure 9:
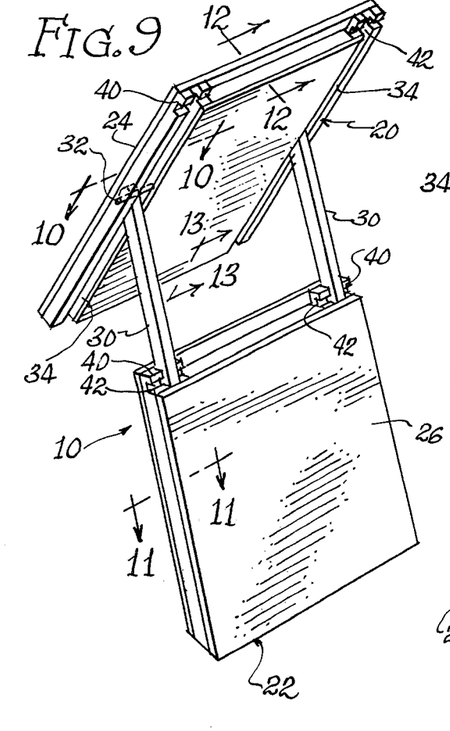
FIG. 9 is a perspective view of a deck construction characterized by the features of the invention.

As best illustrated in FIG. 8, a plurality of the deck structures may be associated with the wall of a vehicle. This arrangement is particularly suitable for complete loading of one deck structure, for example at the front of a truck van. When this deck has been completely loaded, the next collapsible span is brought into position for the convenient loading of this span. Thus, the other deck structures can be maintained conveniently in the vertical position so that they will not interfere with loading of the other deck structures.

Figures 10, 11, 12, 13, 14:
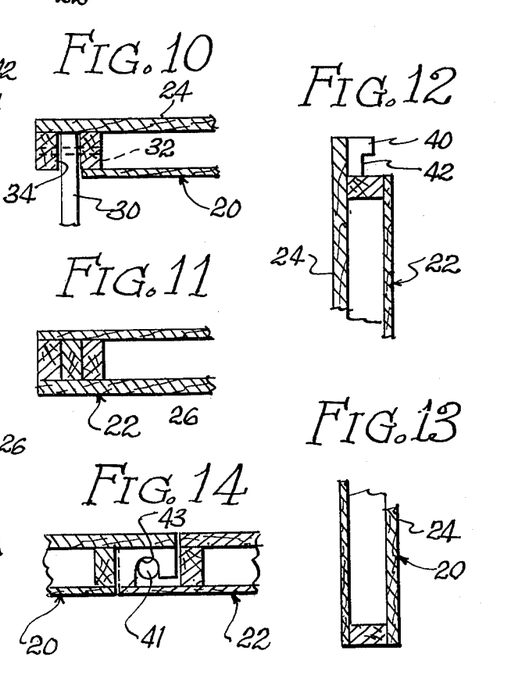
FIG. 10 is a fragmentary sectional view taken about the line 10—10 of FIG. 9.
FIG. 11 is a fragmentary sectional view taken about the line 11—11 of FIG. 9.
FIG. 12 is a fragmentary sectional view taken about the line 12—12 of FIG. 9.
FIG. 13 is a fragmentary sectional view taken about the line 13—13 of FIG. 9.
FIG. 14 is a fragmentary sectional view taken about the line 14—14 of FIG. 9.
Figure 15:
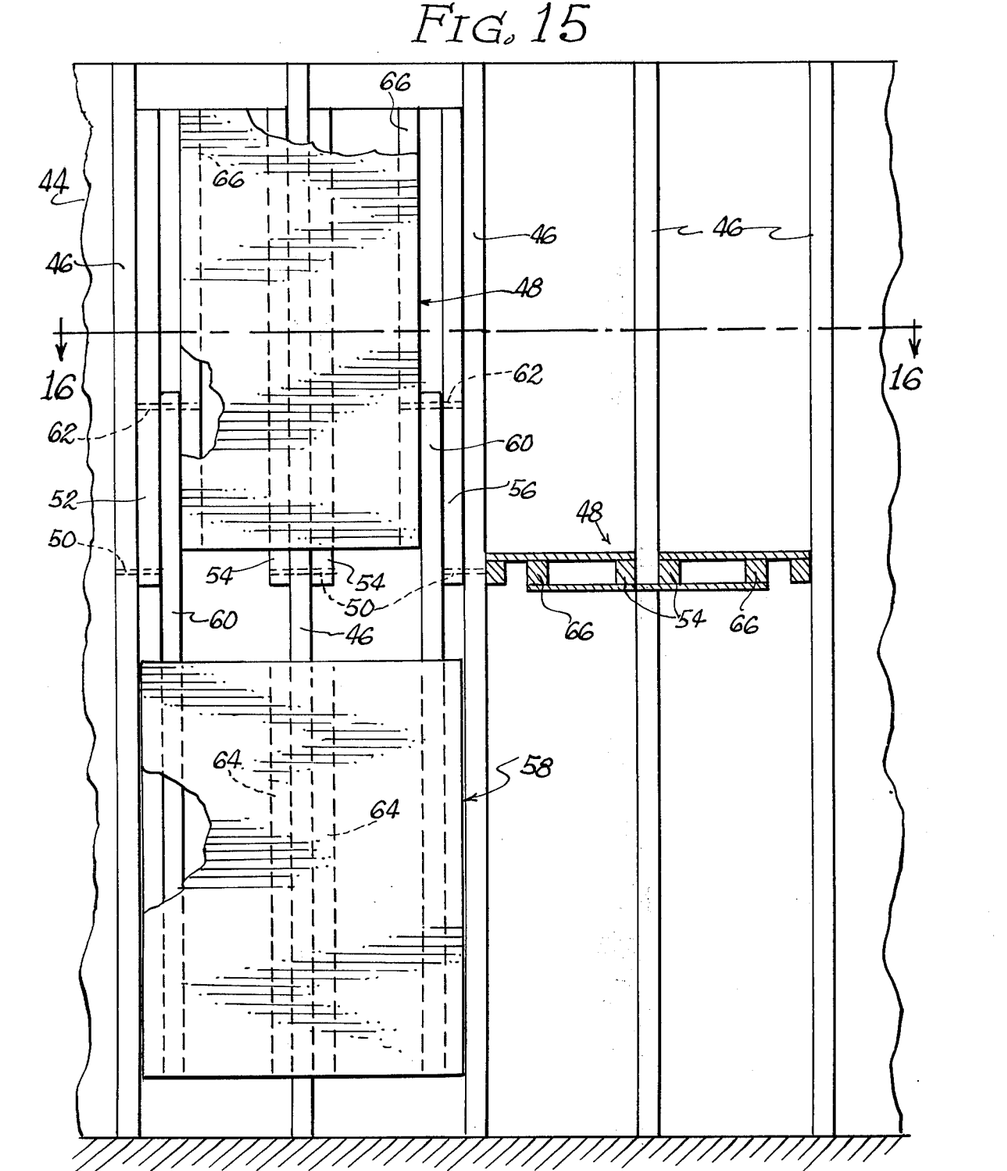
FIG. 15 is a fragmentary elevational view illustrating the side wall of a vehicle having one deck construction illustrated in the vertical position and a second deck construction in cross section, illustrated in the horizontal position.
Figure 16:
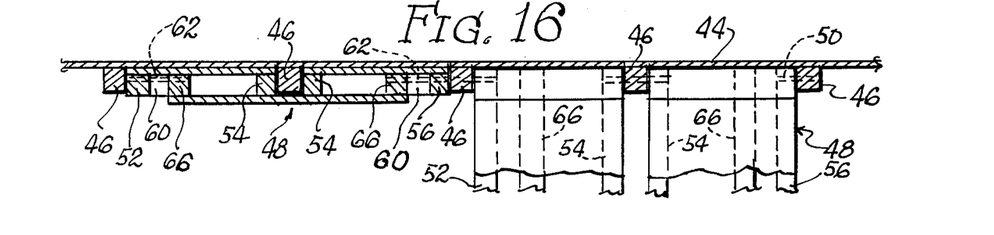
FIG. 16 is a cross-sectional view taken about the line 16—16 of FIG. 15.
Figures 17, 18, 19, 20:
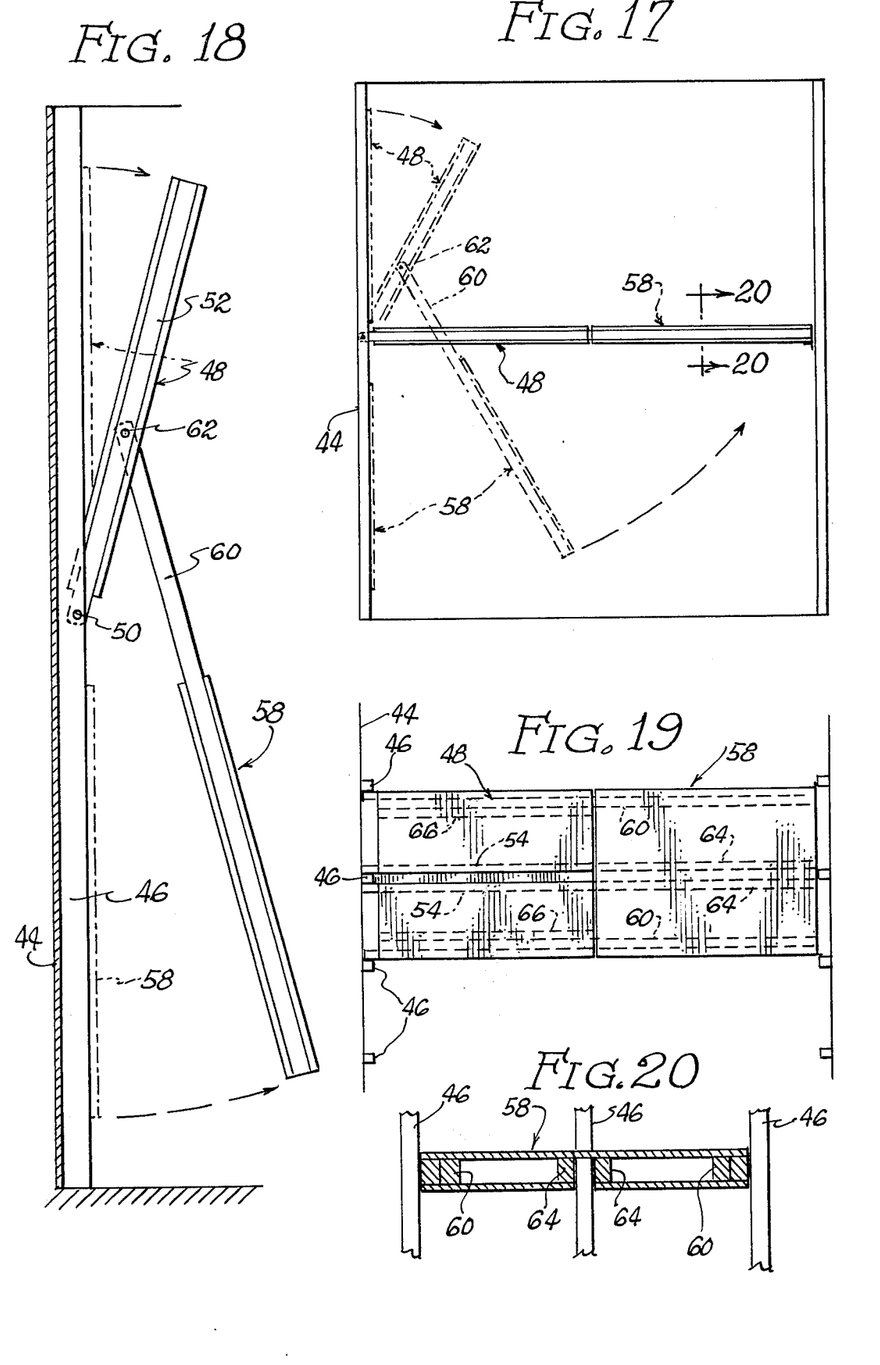
FIG. 17 is an elevational view illustrating the deck construction of FIG. 15 in the horizontal position.
FIG. 18 is an enlarged elevational view of the deck construction of FIG. 15 in the partially collapsed position.
FIG. 19 is a plan view of the deck construction as illustrated in FIG. 17.
FIG. 20 is a cross-sectional view of the deck construction taken about the line 20—20 of FIG. 17.

FIG. 14 illustrates a modification of the first embodiment wherein a short rod 41 is located on each side of section 22, and a groove 43 is defined at each side section 20 for receiving the rods. This provides an alternative to the tongue and groove design already described.

FIGS. 15 through 20 illustrate a modified form of the first embodiment. In this instance, the deck structures are associated with a vehicle side wall 44 which is provided with vertical studding 46. A first deck section 48 is pivotally connected to the side wall by means of pins 50 which are received within openings defined by the respective studs. Arms 52, 54 and 56 which form a part of the deck section 48 are provided for engagement with the pins 50 to provide the desired pivoting action for this deck section. The arms 54 which are located along the centerline of the deck structure 48 are spaced apart by a sufficient distance so that a stud 46 is received between these arms when the structure is folded into the vertical position shown at the left side of FIGS. 15 and 16. The outermost arms 56 are received immediately adjacent studs 46 so that these arms also are located within the confines of the studs. With this arrangement, the arms do not extend inwardly into the vehicle area to be used for storing goods whereby the deck structure will provide economies from the standpoint of maximizing the usable space when the deck structure is not being used.

The lower deck section 58 defines a pair of arms 60 which are connected by means of pins 62 to adjacent studs and the arms 60. The arms 60 are adapted to extend alongside arms 52 and 56 when the deck is collapsed so that these arms do not require any additional space. Similarly, the deck section 58 carries a pair of reenforcing members 64 which are adapted to straddle a stud 46 when the deck structure is in the vertical position. It will, therefore, be appreciated that this lower deck section will also be maintained substantially flush with the outer surfaces of the studding thereby maximizing the efficiency of the deck.

The deck structure illustrated in FIGS. 15 through 19 operates in essentially the same manner as the deck structure previously described. Thus, the one deck section 48 is adapted to pivot downwardly while the other deck section 58 pivots upwardly relative to its pivotal connection with the deck section 48. Interlocking means as previously described are not required with this arrangement due to the provision of the arms 60 and channels provided for receiving these arms. The channels are defined between supporting members 66 defined by the deck structure, these channels virtually eliminating any tendency of the deck structure to move laterally. Thus, the arms 60 are securely confined when in the vertical position shown in FIG. 15. When the deck structure is pivoted to the horizontal position, these arms are again confined in the channel defined between members 52 and 66 although in this case, the arms are positioned on the opposite sides of the pivot pins 62.

FIGS. 21-31 illustrate a second modified form of the first embodiment. This deck structure is also adapted to be associated with a side wall 70 and extends, in the position of use between this side wall and the opposite wall 72. The deck structure is formed from a first section 74 which is pivotally connected to side wall 70, and a second deck section 76 which is pivotally connected to the first section.

Figure 25:
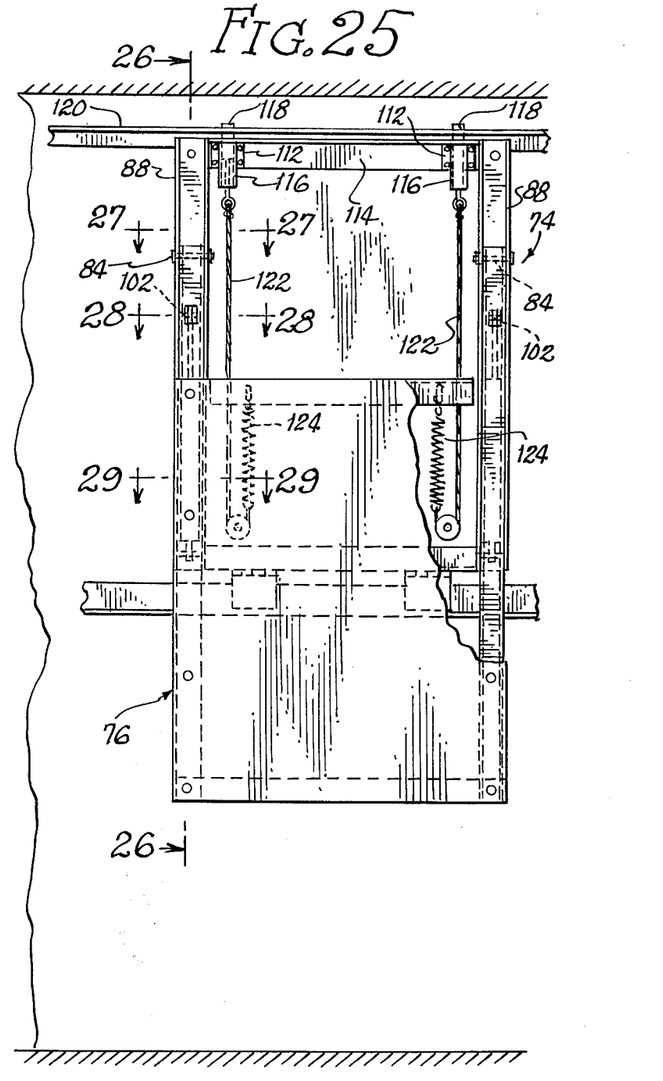
FIG. 25 is an elevational view illustrating the deck structure in a collapsed position.
Figure 30:
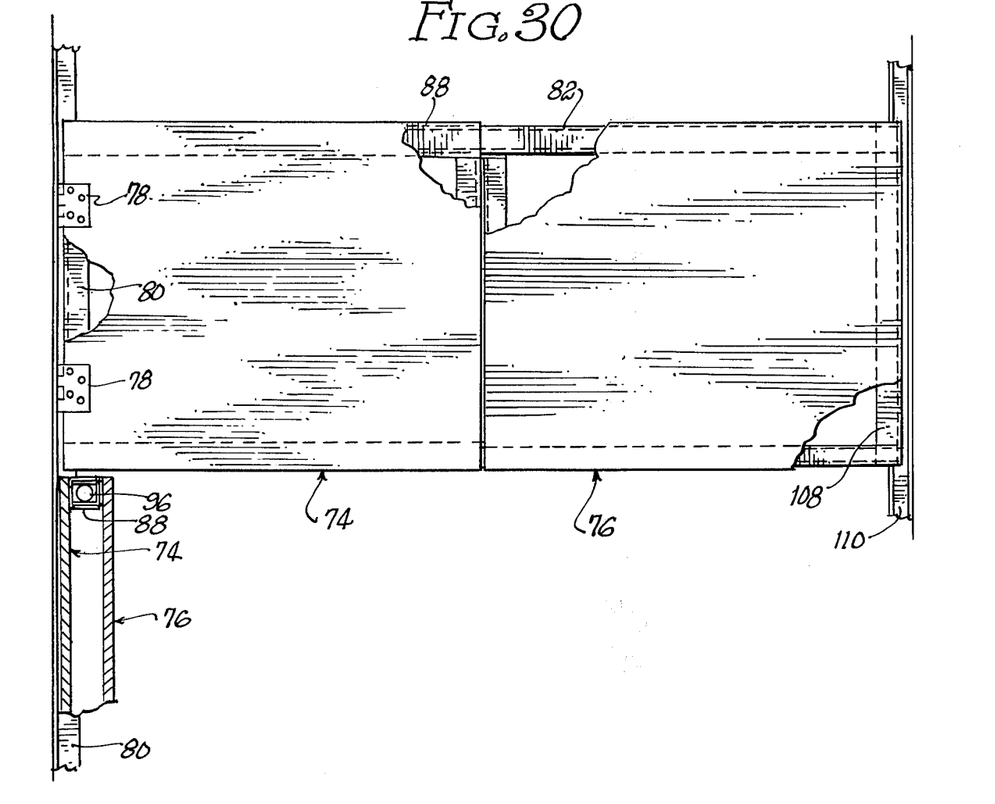
FIG. 30 is a plan view of the deck structure illustrated in the position of use; and, FIG. 31 is a bottom plan view of the deck structure illustrated in FIG. 30.
Figure 31:
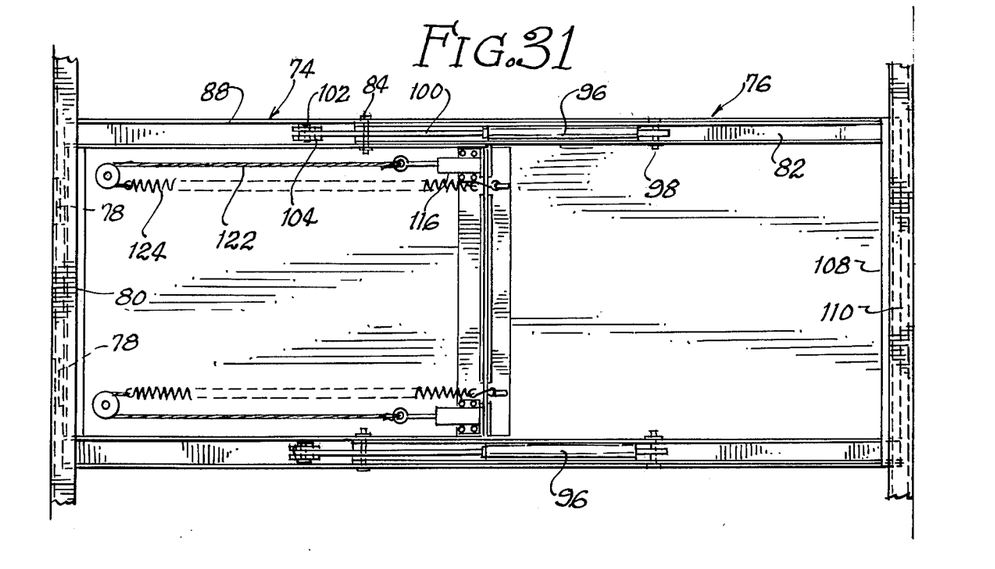

The deck section 74 is secured by means of a hinge 78 attached to angle member 80. This angle member, as best shown in FIGS. 25 and 30, extends along the side wall 70 so that a plurality of the deck structures can be located along the side wall.

Figure 23:
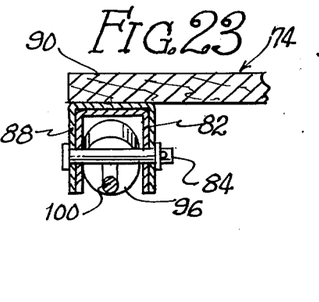
FIG. 23 is an enlarged fragmentary, sectional view taken about the line 23—23 of FIG. 21.
Figure 24:
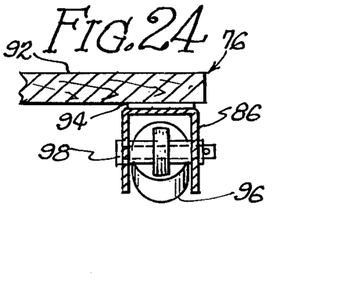
FIG. 24 is an enlarged fragmentary, sectional view taken about the line 24—24 of FIG. 21.

The deck section 76 is provided with arms 82 which are pivotally connected by means of pins 84 to the deck section 74. As best shown in FIG. 23, the arms 82 preferably comprise extensions of a channel which has a forward section 86 whereby the channels provide support for the deck section 76. Channels 88 attached to the underside of deck section 74 are of slightly greater dimension than the channels 82, 86 whereby the latter channels are receivable within the channels 88. The respective deck sections are formed by means of plates or flat boards 90 and 92 with the channels providing the necessary support for these beds. Spacers 94 are carried on the top wall of channels 82-86 whereby the bed 92 will be at the same level as the bed 90 when the deck structure is unfolded into the position of use.

A pair of cylinders 96 are pivotally connected by means of pins 98 to the channels 86. The pistons 100 of the cylinders extend to a connection provided by means of pins 102 which are held by brackets 104 secured to the channels 88. The pistons and cylinders are preferably of a double acting type whereby movement of the deck sections relative to each other is restrained in both directions. Thus, as a matter of safety, it is preferred that the deck sections do not move too rapidly particularly when unfolding the decks to the position shown in FIG. 21.

Figure 21:
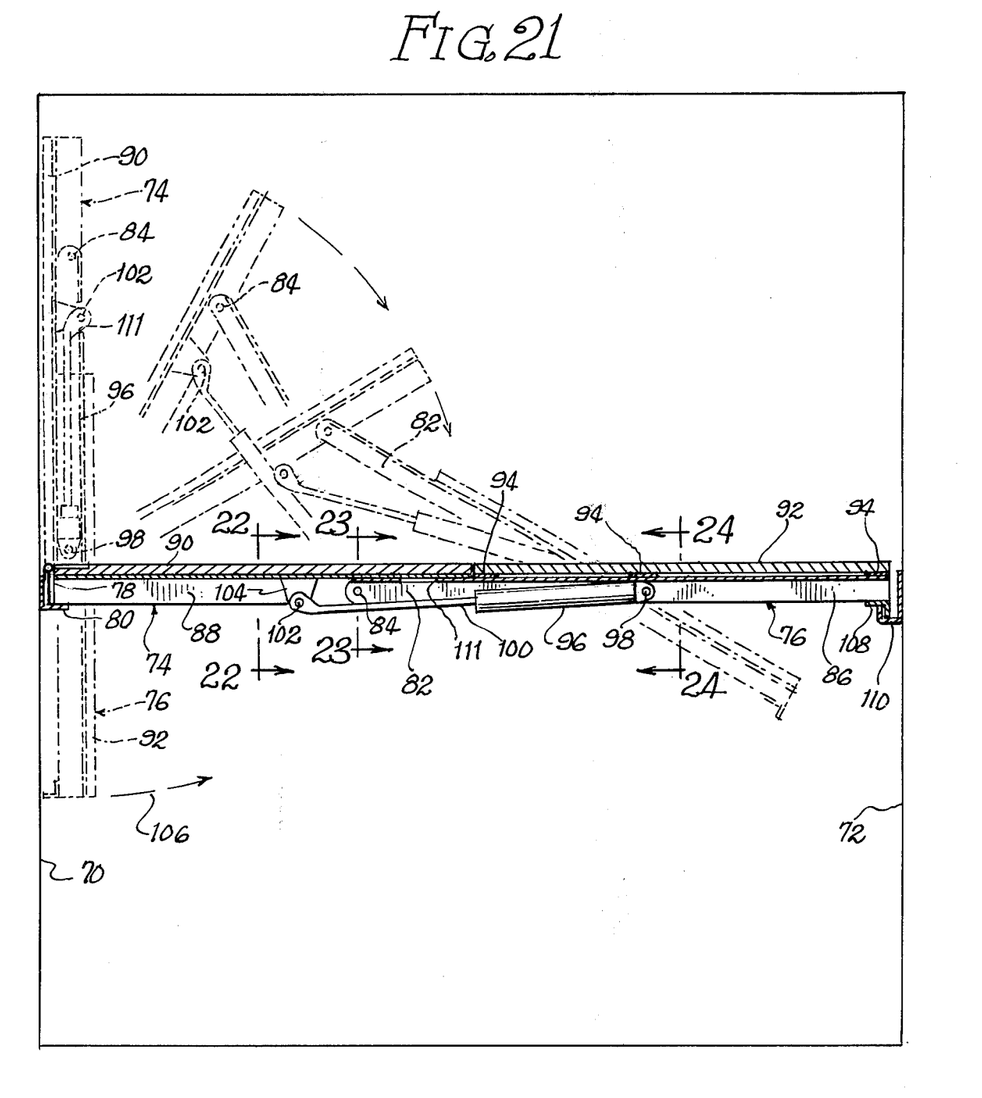
FIG. 21 is a cross-sectional view of a modified form of the deck structure.
Figure 22:
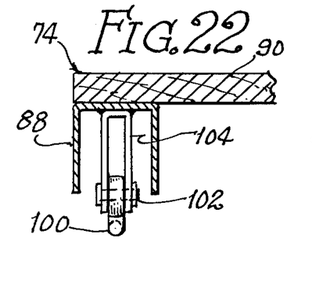
FIG. 22 is an enlarged fragmentary, sectional view taken about the line 22—22 of FIG. 21.

In moving a deck structure from the vertical position shown in FIG. 21 to the horizontal position, it is first desirable to pivot the deck section 76 outwardly from the bottom in the direction of the arrow 106. This movement naturally pivots the arms 82 and the initiation of this movement and particularly the forces exerted by the deck section 76 on the deck section 74 results in the pulling of the deck section 74 away from the position shown. As is illustrated in dotted lines, the more extensive the movement in this direction, the greater the extension of the piston 100 of the cylinder 96. If this cylinder is provided with means which resist the extension of the piston 100, then the movement of the decks will be restrained so that a slow and safe movement is accomplished.

The outer end of the section 76 is provided with an angle member 108 which is adapted to be received within a channel defined by angle member 110. This angle member 110 also serves as a ledge whereby decks lined up side-by-side in the construction can all be secured by this arrangement. An opening 111 defined by the extension 82 of channel 76 receives the bracket 104 when the decks are in the collapsed state.

FIGS. 25 through 31 illustrate the deck structure with a latch mechanism provided for holding the deck in the collapsed position. Specifically, a pair of brackets 112 are secured to an angle member 114, and these brackets support latch structures 116. The latch structures consist of spring loaded pistons 118 which are normally urged upwardly into a latching position. An angle member 120 extends adjacent the top wall 121 of the vehicle, and this latch defines openings for receiving the respective pistons.

Figure 26:
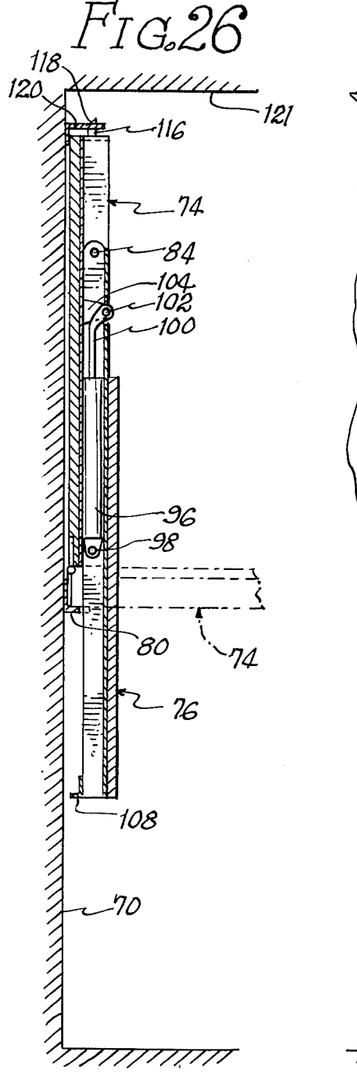
FIG. 26 is a side elevation taken about the line 26—26 of FIG. 25.
Figure 27:
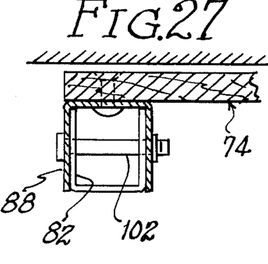
FIG. 27 is an enlarged fragmentary, cross-sectional view taken about the line 27—27 of FIG. 25.
Figure 28:
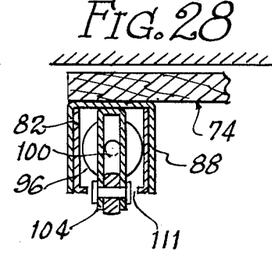
FIG. 28 is an enlarged fragmentary, cross-sectional view taken about the line 28—28 of FIG. 25.
Figure 29:
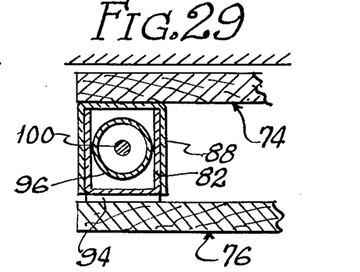
FIG. 29 is an enlarged fragmentary, cross-sectional view taken about the line 29—29 of FIG. 25.

As best shown in FIGS. 25 and 26, the pistons in the raised position, are received within openings defined by angle members 120 so that the deck structure is firmly held in position. When it is desired to release the deck structure for folding into a position of use, means may be incorporated for automatic operation. One such means comprising cable 122 and tension spring 124 may be provided for this purpose.

As the deck section 76 is pivoted outwardly, there is an extension of the springs 124 which applies force through cables 122 thereby forcing the latch members 118 downwardly. This will release the latch members freeing the deck section 74. It will be appreciated that if the deck section 76 is not pivoted sufficiently to release the latch members, the springs 124 will force the deck section 76 back to the vertical position.

The latching arrangement illustrated provides for an automatic latching when the decks are moved from a position of use to the collapsed position. Thus, the ends of the latches 118 are slanted as shown in FIG. 26 so that the latches will be cammed downwardly against the angle member 120 and then snap into position in the openings provided by the member 120.

The latching arrangement described represents only one version of a structure which can be utilized for purposes of accomplishing the results of the invention, and it will be appreciated that latches of different types and modes of operation may be utilized. In the embodiments illustrated in FIGS. 21–31, it will be noted that the lower deck section overlaps the upper deck section when these sections are in the collapsed condition. This arrangement is particularly valuable where the horizontal span of the deck is relatively great but where the vertical space available along a wall is limited. It will be appreciated that the degree of overlap can be regulated depending upon the space requirements available.

Referring now to FIGS. 32 through 40, a second embodiment of the deck structure according to the present invention is shown. In this embodiment a one-piece collapsible deck 200 is employed. As with the first embodiment, the deck 200 is movable between a vertical position parallel to side wall 202 and a horizontal position perpendicular to wall 202 and wall 204. In this embodiment the collapsible deck is adapted to move in vertical guide channels 206 provided along the wall 202 on guide wheels 207. As illustrated best in FIG. 32, when moving the deck 200 from its vertical position to the horizontal position, the deck moves downwardly in the guide track 206 as the far end of the deck 208 is pivoted into proximity with the wall 204.

The walls 204 and 206 are provided with vertically adjustable stops for selecting the height at which the deck is horizontally positioned. The stops for each wall are of course set at an equal height above the vehicle bed.

Figures 32, 34:
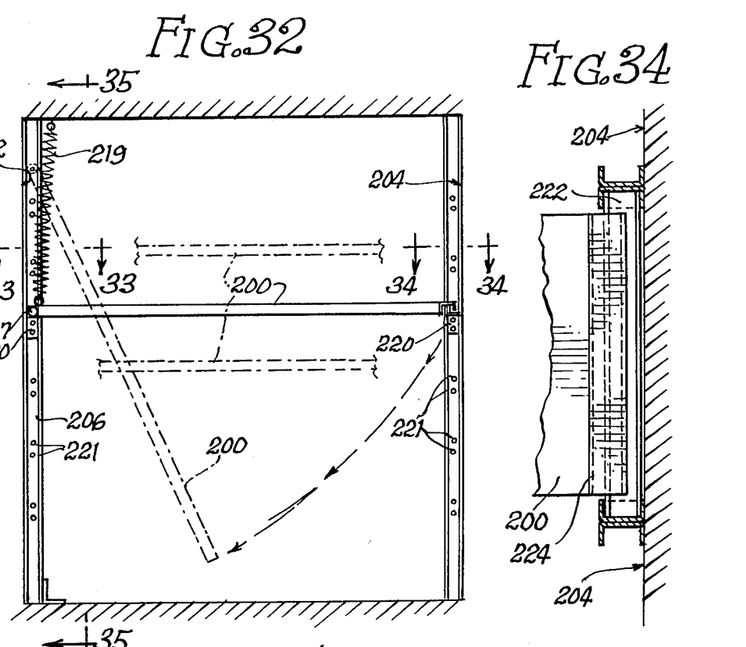
FIG. 32 is a side view of a second embodiment of the collapsible deck structure according to the present invention.
FIGS. 33 and 34 are cross-sectional views taken along the lines 33—33 and 34—34 of FIG. 32.
Figure 33:
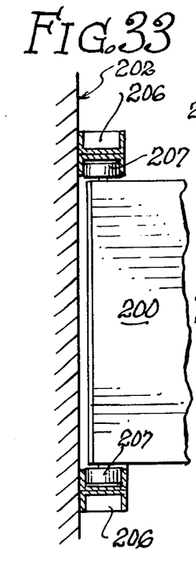
Figure 35:
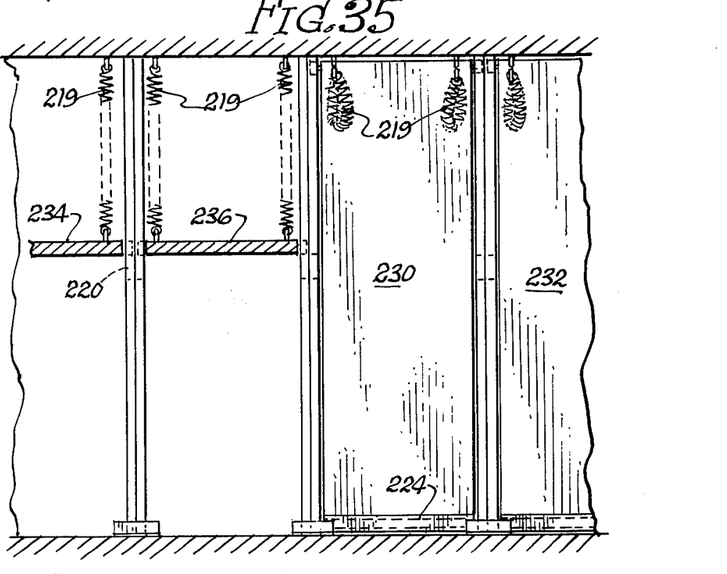
FIG. 35 is a cross-sectional view taken along the lines 35—35 of FIG. 32.
Figure 36:
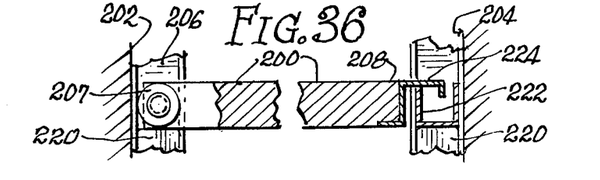
FIG. 36 is an enlarged side view showing the mounting of the collapsible deck to the side walls.

Referring to FIGS. 32–36, the details of the adjusting mechanism for the vertical height of the deck in its horizontally disposed position is disclosed. In one embodiment the deck is maintained at a selected vertical height by the securing of an adjustable block 220 on each side of the deck. These blocks are adapted to ride in the guide channels and to be secured in position with conventional hardware. A plurality of holes 221 are illustrated in FIG. 32 wherein the adjustable blocks 220 are bolted or pinned to one set of holes at a desired height. On wall 204 the block 220 supports a member 222 adapted to receive an engaging member 224 on the end 208 of the deck (FIG. 36).

Figure 37:
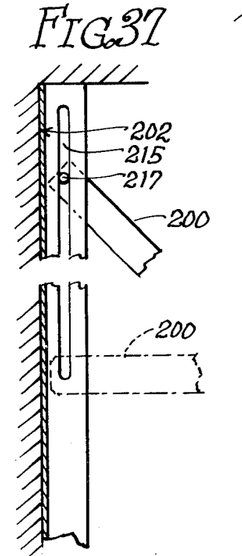
FIG. 37 shows an alternate mounting technique for one end of the collapsible deck employing a guide channel.

An alternative to providing guide tracks 206 for receiving the wheels 210 is to provide a slotted channel 215 in a T-shaped wall member as illustrated in FIG. 37. The deck 200 slides up and down the wall 202 connected to a pin 217 which is restrained in the channel 215. As shown in FIG. 32 it is desirable to provide a spring 219 or other damping mechanism to slow the descent of the deck when being moved from the vertical to the horizontal position. A spring has the advantage of not only slowing down the descent but also in assisting returning the deck to the vertical position after use.

Figure 38:
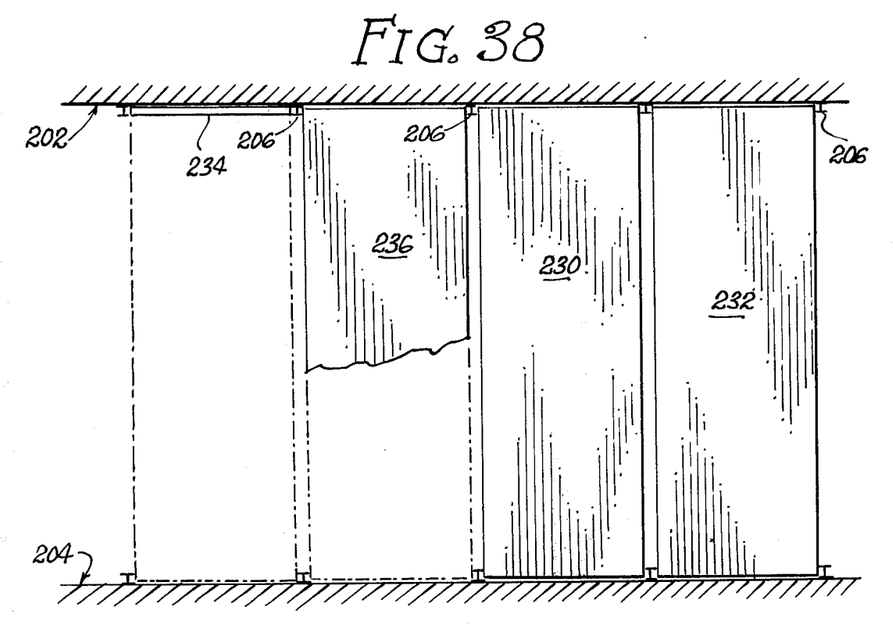
FIG. 38 is a plan view of a plurality of decks according to the second embodiment of the present invention.

Referring to FIG. 35, a side view is illustrated wherein a plurality of separate decks are illustrated. Decks 230 and 232 are illustrated in their vertical stored position whereas decks 234 and 236 are shown in their horizontally disposed position for receiving articles thereon. FIG. 38 is a plan view showing this same type of arrangement. In the plan view, however, decks 230, 232 and 236 are shown in their horizontally disposed position while deck 234 is shown in its vertically stored position.

Figure 39:
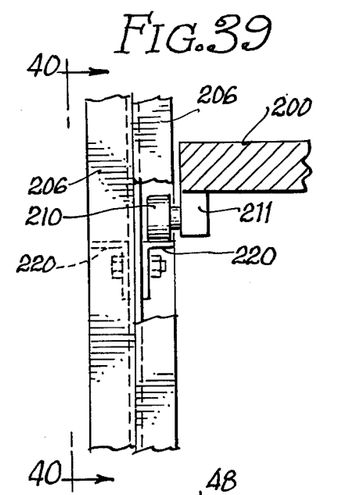
FIG. 39 is an enlarged view of the details of the mounting of the collapsible deck to one of the walls according to an alternate technique.
Figures 40, 41, 48:
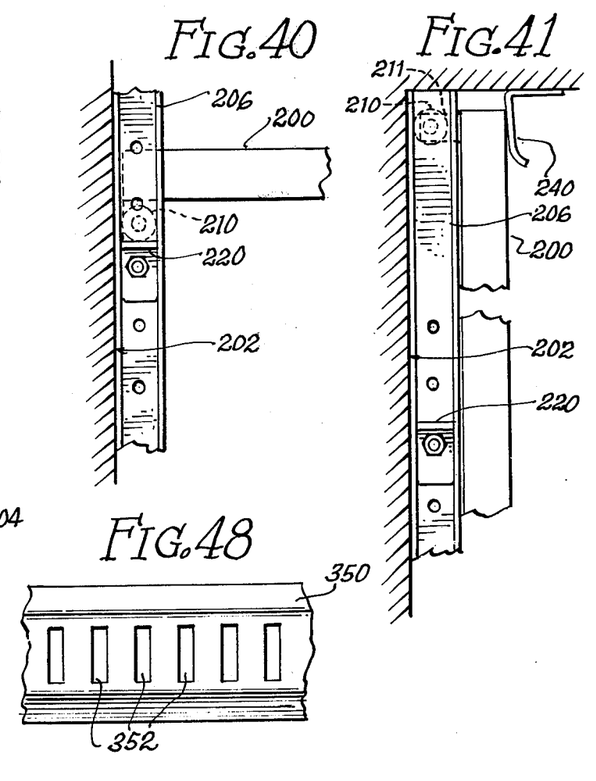
FIG. 40 is a view of the alternate mounting taken along the lines 40—40 of FIG. 39.
FIG. 41 is a view similar to FIG. 40 illustrating the deck in its stored position.
FIGS. 47 and 48 illustrate variations in the end mounting for the collapsible deck.

In FIGS. 39 and 40, an enlarged view of the deck 200, guide channel 206, a modified wheel 210 and a modified adjustable stop 220 are illustrated for the horizontally disposed position of the deck. In this variant, the wheels 210 are carried on a flange 211 extending downwardly from the deck. In the stored position this permits the deck to ride flush against the wall 202 where no recess in the wall is provided.

FIG. 41 illustrates a view of the deck in its vertically stored position wherein the top of the deck is retained in its vertical position by a retaining clip 240 in place of or in addition to spring 219.

Figure 44:
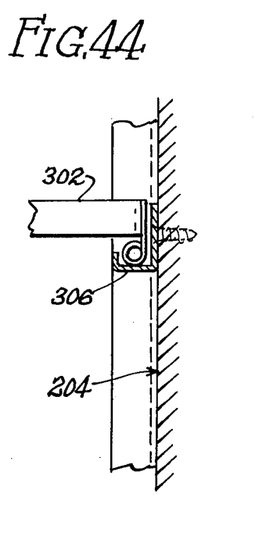
Figures 45, 46, 46A, 51:
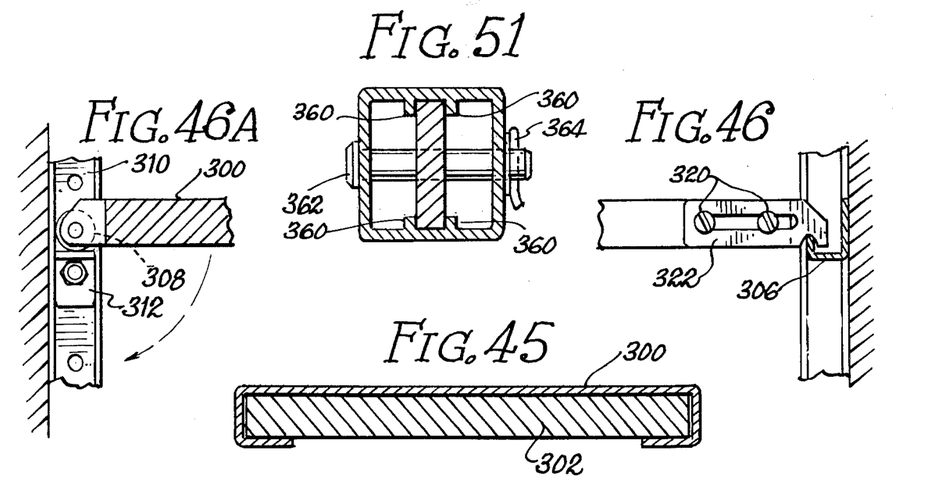
FIG. 45 is a cross-sectional view taken along the lines 45—45 of FIG. 42.
FIG. 46 is an enlarged side view illustrating the details of an end mounting bracket for the deck.
FIG. 46A illustrates an alternate mounting technique for the collapsible deck according to the third embodiment.
FIG. 51 shows a further variation of the end mounting hardware.

Referring now to FIGS. 42 through 45, a third embodiment according to the present invention is disclosed. In this embodiment the deck comprises a two-piece, telescoping structure. Mounted to the wall 202, is a first section 300 having a rectangular cross section and open on the bottom as illustrated in FIG. 45. Adapted to fit within the confines of the section 300 is a second deck section 302 of substantially solid rectangular cross section. Of course, if desired, the section 302 may be formed in a shape substantially identical to that of section 300 but of a dimension to fit within section 300. The section 302 moves longitudinally inside the section 300 retracting or extending therefrom as required. In the stored vertical position indicated in dashed lines in FIG. 42, the section 302 is fully retracted inside the section 300 and the assembly is attached to the wall 202. In the horizontal position indicated by solid lines, the section 302 is extended from section 300 and engages the wall 304. As shown in FIG. 44, section 302 may be received in an L-shaped ledge 306 on the wall 204. Ledge 306 is adjustable to various heights on wall 204. The section 300 is attached to wall 202 (FIG. 43) by means such as a barrel bolt passing through a T-shaped channel or pipe 309. Holes are provided in the channel at various heights corresponding to the heights of the ledge 306 for receiving the bolt.

Referring to FIG. 46A, it will be observed that the telescoping embodiment can also be provided with a roller and guide track assembly 308 and 310 in a manner similar to that described for the embodiment for FIG. 32. In such a construction, there would again be provided adjustable stop 312.

Figure 42:
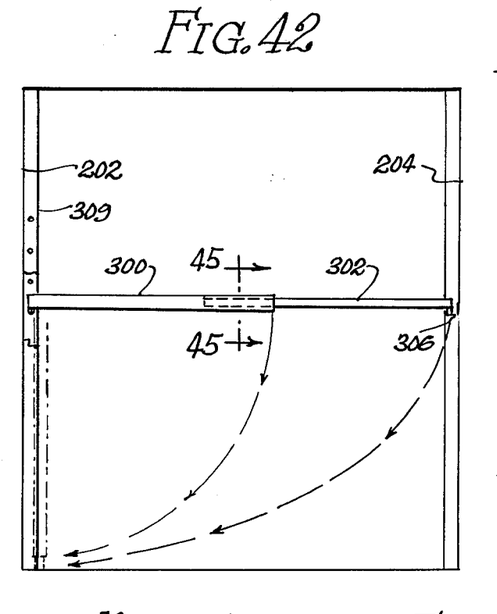
FIG. 42 is a side view of the collapsible deck according to a third embodiment of the present invention.
Figure 43:
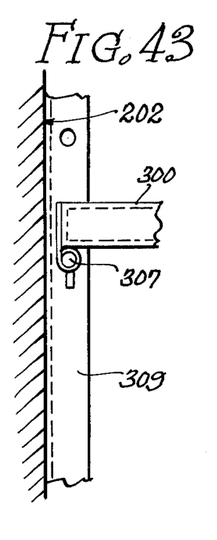
FIGS. 43 and 44 are cross-sectional views taken along the lines 43—43 and 44—44 of FIG. 42.

FIG. 46 illustrates an adjustable end connection for section 302 of the FIG. 42 embodiment or for the far end of deck 200 of the FIG. 32 embodiment. Variations in the width between the walls of the vehicle on which the deck is supported are accounted for by loosening the set screws 320, moving the channeled plate 322 to a distance wherein it fits properly in the ledge 306 and then retightening the set screws 320.

Figure 47:
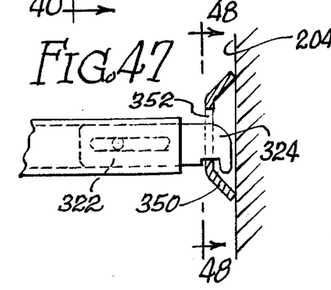

FIGS. 47 and 48 disclose further variations for the adjustable end connection for the collapsible deck. In FIG. 47, the adjustable end connector illustrated in FIG. 46 is shown engaging a rail 350 attached to wall 204. As shown best in FIG. 48, the rail 350 has a number of horizontally spaced slots 352 therein. As will be apparent, the plate 322 is adjusted so that the curved portion 324 thereof fits through one of the corresponding slots 352.

Figure 49:
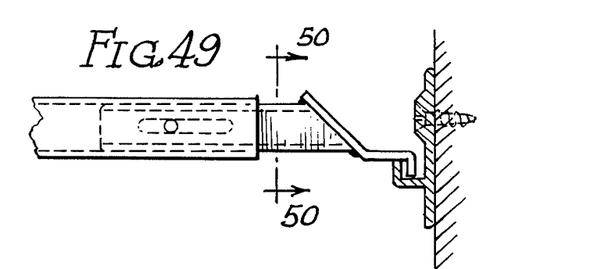
FIGS. 49 and 50 illustrate another variation of the end mounting hardware for the collapsible deck, FIG. 50 being a sectional view through FIG. 49 along the lines 50—50.
Figure 50:
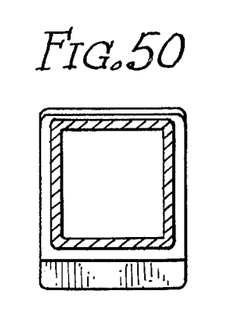

Referring to FIGS. 49 and 50, a still further modification of an adjustable end connector is disclosed. In FIG. 49 the adjustable end connector is shown engaging a ledge wall connector. FIG. 50 shows that the FIG. 49 end connector is desirably carried in telescoping relation on the end of the collapsible deck. FIG. 51 illustrates a modification whereby a pair of guide channels 360 are provided for the end connection and the end connection is secured in place by a pin 362 locked in place with a cotter pin 364 or other convenient locking means.

The above description provides means for obtaining an intermediate deck in a vehicle in an extremely efficient fashion. Thus, the structures are characterized by relatively basic designs whereby high manufacturing and installation costs are avoided. Furthermore, the manner of using the designs is extremely straightforward whereby no particular training or skills are required for their use.

In locating the structures in cars, trailers, vans or the like, each deck may have a width of 3 or 4 feet. In order to provide an intermediate platform over the entire vehicle floor, 10 or more decks may be required, and it may be desirable to locate the collapsed decks on both sides of the vehicle to provide balance during use.

It will be understood that various changes and modifications may be made in the construction described which provide the characteristics of the invention without departing from the spirit thereof particularly as defined in the following claims.

That which is claimed is:

1. In a vehicle for transporting articles wherein a bed is provided for supporting the articles and including upstanding walls on opposite sides of the bed, the improvement comprising a collapsible deck having a first position extending horizontally over said bed between said side walls and a second position extending vertically relative to said bed adjacent one of said side walls, said deck including a first section, means pivotally connecting said first section to one side wall at a level spaced upwardly from said bed, and a second deck section, means pivotally connecting said second section to said first section at a position on said first section spaced away from said pivotal connection of said first section with said one side wall, said second section extending from said level in a direction opposite the first section when the deck extends vertically, movement of said deck from said second position to said first position resulting from pivoting of said first section away from said side wall and pivoting of said second section relative to said first section, said sections both extending on the same side of said level when said deck is in the first position, and means for supporting the outer end of said second section on the opposite side wall when said deck is in said first position.

2. A construction in accordance with claim 1 wherein said second section defines arms extending away from the end of said second section opposite said outer end, the pivotal connection of said second section and said first section being located at the end of said arms.

3. A construction in accordance with claim 2 including means for interlocking said sections at a point intermediate the span of the deck when in the horizontal position.

4. A construction in accordance with claim 3 wherein said interlocking means comprise tongue and groove means defined at the adjacent ends of said sections when in the horizontal position.

5. A construction in accordance with claim 1 wherein said first and second sections each define flat supporting surfaces.

6. A construction in accordance with claim 5 wherein said second section defines arms extending away from the end of said second section opposite said outer end, the pivotal connection of said second section and said first section being located at the end of said arms, and including channels defined by said first section opposite the supporting surface thereof, said arms being pivotally connected in line with said channels for receipt of the arms in the channels when the deck is in either of its positions.

7. A construction in accordance with claim 1 including a plurality of said decks located side-by-side within said vehicle, said decks being individually movable between said vertical and horizontal positions.

8. A construction in accordance with claim 1 wherein said vehicle is provided with vertically extending studs located in spaced apart relationship along said one side wall, said first section being pivotally connected to at least one of said studs, and recesses defined by said first and second sections adapted to receive said studs when the deck is in said vertical position whereby the deck is substantially flush with the outer surfaces of the studs when the deck is in the vertical position.

9. A construction in accordance with claim 8 wherein said second section defines arms extending away from the end of said second section opposite outer end, the pivotal connection of said second section and said first section being located at the end of said arms, and including channels defined by said first section opposite the supporting surface thereof, said arms being pivotally connected in line with said channels for receipt of the arms in the channels when the deck is in either of its positions.

10. A construction in accordance with claim 9 including a plurality of said decks located side-by-side within said vehicle, said decks being individually movable between said vertical and horizontal positions.

11. A construction in accordance with claim 1 including cylinder and piston means interposed between said deck sections, the speed of the piston within the cylinder being restricted whereby the rate of movement of the deck sections is restricted.

12. A construction in accordance with claim 11 wherein said piston and cylinder means provide for restriction of the speed of piston movement in both directions whereby the deck movement is restricted during movement to either of said first and second positions.

13. A construction in accordance with claim 1 including a latch means associated with one deck section for holding the deck in said second position.

14. A construction in accordance in claim 13 including spring means associated with said latch means, means connecting the other deck section to said spring means whereby movement of said other deck section while the deck is in said second position results in releasing of said latch through said spring means.

15. A construction in accordance with claim 1 wherein said first and second deck sections overlap at least partially when in said second position, movement of the deck sections from said second position to said first position resulting in end-to-end alignment of the deck sections.

16. In a vehicle for transporting articles wherein a bed is provided for supporting the articles and including upstanding walls on opposite sides of the bed, the improvement comprising:
a one piece deck having a first position extending horizontally over said bed between said side walls and a second position extending vertically relative to said bed adjacent one of said side walls,
deck support means on one side wall,
means attached to one end of said deck for engaging said support means for vertical movement therein, movement of said deck from said vertical position to said horizontal position resulting from vertical movement of said one end of said deck along said one side wall while pivoting the other end relative to said one end until both ends are in said first position, and
means for supporting the other end of said deck on the other side wall when said deck is in said first position.

17. In a vehicle for transporting articles wherein a bed is provided for supporting the articles and including upstanding walls on opposite sides of the bed, the improvement comprising:
a collapsible deck having a first position extending horizontally over said bed between said side walls and a second position extending vertically relative to said bed adjacent one of said side walls,
deck support means on one side wall including: a guide channel adapted to engage said attached means and an adjustable stop positioned along said guide channel to limit the vertically downward movement of said attached means in said channel to a preselected height above said bed,
means attached to one end of said deck for engaging said support means for vertical movement therein, movement of said deck from said vertical position to said horizontal position resulting from lowering of said one end of said deck while pivoting the other end relative to said one end until both ends are in said first position, and
means for supporting the other end of said deck on the other side wall when said deck is in said first position.

18. The construction of claim 17 wherein said means for supporting the other end of said deck is also preset to said preselected height.

19. The construction of claim 16 further including adjustable stops on both support means for selecting the height the deck is maintained above said bed in said first position.

20. In a vehicle for transporting articles wherein a bed is provided for supporting the articles and including upstanding walls on opposite sides of the bed, the improvement comprising:
a collapsible deck having a first position extending horizontally over said bed between said side walls and a second position extending vertically relative to said bed adjacent one of said side walls,
deck support means on one side wall including an elongated slot adapted to receive said attached means therein and an adjustable stop positioned along said guide channel to limit the vertically downward movement of said attached means in said channel to a preselected height above said bed,
means attached to one end of said deck for engaging said support means for vertical movement therein, movement of said deck from said vertical position to said horizontal position resulting from vertical movement of said one end of said deck along said one side wall while pivoting the other end relative to said one end until both ends are in said first position, and means for supporting the other end of said deck on the other side wall when said deck is in said first position.

21. The construction of claim 17 wherein said means attached to one end of said deck includes a pair of rollers adapted to track vertically in said guide channel.

22. The construction of claim 20 wherein said attached means includes a pivot adapted to move vertically in said slot and about which said deck pivots from said vertical to said horizontal position.

23. The construction of claim 16 wherein said means for supporting the other end of said deck includes receiving means attached to said other side wall and means mounted on the other end of said deck for engaging said receiving means when said deck is in the horizontal position.

24. A construction in accordance with claim 16 including a plurality of said decks located side by side within said vehicle, said decks being individually movably between said vertical and horizontal positions.

25. A construction in accordance with claim 16 further including latch means associated with said deck for holding the deck in said second position and spring means for restricting the rate of movement of said deck between positions.

26. In a vehicle for transporting articles wherein a bed is provided for supporting the articles and including upstanding walls on opposite sides of the bed, the improvement comprising a collapsible deck having a first position extending horizontally over said bed between said side walls and a second position extending vertically relative to said bed adjacent one of said side walls, said deck including a first section, means for pivotally connecting said first section to one side wall at a level spaced upwardly from said bed, and a second deck section telescoped within said first section, said second section being retracted into said first section when the deck is vertical and extended at least part way when said deck is horizontal, movement of said deck from said second position to said first position resulting from pivoting of said first section away from said side wall and extending said second section relative to said first section, and means for supporting the outer end of said second section on the other of said side walls when said deck is in said horizontal position.

27. The construction of claim 26 wherein said means for pivotally connecting said first section is adjustable to a preselected height above said bed.

28. The construction of claim 27 wherein said means for supporting the outer end of said second section is also set to said preselected height.

29. The construction of claim 26 including a plurality of said decks located side by side within said vehicle, said decks being individually movable between said vertical and horizontal positions.

30. The construction of claim 23 wherein said receiving means is a rail having a plurality of horizontally spaced slots for receiving said means for engaging.

31. The construction of claim 23 wherein said means for engaging said receiving means is adjustable to accommodate variations in the width between said walls.

32. The construction of claim 23 wherein said means for engaging said receiving means is carried by said deck and positioned by a pair of guide members.

* * * * *